(12) United States Patent
Utsunomiya

(10) Patent No.: US 7,652,454 B2
(45) Date of Patent: Jan. 26, 2010

(54) ELECTRONIC EQUIPMENT HAVING A BOOST DC-DC CONVERTER

(75) Inventor: Fumiyasu Utsunomiya, Chiba (JP)

(73) Assignee: Seiko Instruments Inc., Chiba (JP)

( * ) Notice: Subject to any disclaimer, the term of this patent is extended or adjusted under 35 U.S.C. 154(b) by 475 days.

(21) Appl. No.: 11/542,486

(22) Filed: Oct. 3, 2006

(65) Prior Publication Data

US 2007/0085514 A1     Apr. 19, 2007

(30) Foreign Application Priority Data

Oct. 5, 2005     (JP) .............................. 2005-292008

(51) Int. Cl.
*G05F 1/00* (2006.01)
(52) U.S. Cl. .................. 323/265; 323/282; 307/151
(58) Field of Classification Search ............... 307/46, 307/151; 323/222, 259, 282, 284, 285, 265
See application file for complete search history.

(56) References Cited

U.S. PATENT DOCUMENTS

| 2004/0017113 | A1* | 1/2004 | Xing et al. ................. 307/44 |
| 2006/0197382 | A1* | 9/2006 | Chou et al. ................. 307/48 |
| 2006/0226816 | A1* | 10/2006 | Wai et al. ................. 323/222 |

FOREIGN PATENT DOCUMENTS

JP     2004-120950     4/2004

OTHER PUBLICATIONS

Marei et al., DC/DC converters for fuel cell powered hybrid electric vehicle, Vehicle Power and Propulsion, 2005 IEEE Conference, pp. 126-129.*

* cited by examiner

*Primary Examiner*—Albert W Paladini
*Assistant Examiner*—Daniel Cavallari
(74) *Attorney, Agent, or Firm*—Brinks Hofer Gilson & Lione

(57) ABSTRACT

Provided is an electronic equipment including: a boost DC-DC converter and an electric power storage device, in which the electric power storage device is charged with a electric power outputted the DC-DC converter with efficiency, and in which stored electric power of the electric power storage device is not wastefully consumed even when supply of the electric power is stopped. The electronic equipment including the power supply, the boost DC-DC converter, a rectifier rectifying a pulse-like boosted electric power outputted the DC-DC converter to a second boosted electric power, and the electric power storage device for charging a first boosted electric power from the boost DC-DC converter, wherein an operation of the boost DC-DC converter is maintained by the second boosted electric power.

6 Claims, 3 Drawing Sheets

ELECTRONIC EQUIPMENT HAVING A BOOST DC-DC CONVERTER

This application claims priority under 35 U.S.C. §119 to Japanese Patent Application No. JP2005-292008 filed Oct. 5, 2005, the entire content of which is hereby incorporated by reference

BACKGROUND OF THE INVENTION

1. Field of the Invention

The present invention relates to an electronic equipment having a boost DC-DC converter.

2. Description of the Related Art

In recent years, it has been brought to attention to utilize electric power generated by a power generation device such as a fuel cell, a solar cell, or a thermal power generation device using a Seebeck effect from an environmental point of view. In the fuel cell, however, the generated electric power cannot follow a rapid load change, and an amount of the generated electric power for the solar cell or the thermal power generation device is fluctuated due to a surrounding environment. Thus, in a case where electric power of those power generation devices is directly supplied to a load circuit, it is difficult to stably operate the load circuit at a desired time. Accordingly, generally adopted is a method in which electric power outputted from those power generation devices is temporarily stored in an electric power storage device to drive the load by using the stored electric power.

Further, those power generation devices have been utilized as a power supply for a portable electrical equipment, so it is required to reduce the power generation devices in size. In order to reduce the power generation devices in size, it is necessary to reduce the number of cells of the fuel cell or the solar cell, and it is also necessary to reduce the number of series of P-type and N-type pillars. As a result, voltage of the electric power generated by those power generation devices is more likely to be lower than charging voltage of the electric power storage device, and the electric power generated by those power generation devices is difficult to directly charge into the electric power storage device in many cases.

For this reason, generally adopted is a method in which a boost DC-DC converter is provided between one of those power generation devices and the electric power storage device, electric power having low voltage generated by those power generation devices is converted into, in the boost DC-DC converter, boosted electric power which is boosted up to voltage which the electric power storage device can store, and the boosted electric power is charged into the electric power storage device.

FIG. 6 shows a configuration of a conventional electronic equipment in which electric power generated by a power generation device is charged into an electric power storage device by utilizing a boost DC-DC converter. The electronic equipment shown in FIG. 6 includes a power generation device 101 for generating electric power such as a fuel cell, a solar cell, or a thermal power generation device, a boost DC-DC converter 102 for boosting voltage of the electric power of the power generation device 101, an electric power storage device 103 for charging the boosted electric power outputted by the boost DC-DC converter 102, and a Schottky diode 401 for preventing stored electric power of the electric power storage device 103 from flowing reversely to the boost DC-DC converter 102. A generated electric power output terminal 107 of the power generation device 101 is connected to an input terminal 108 of the boost DC-DC converter 102. An output terminal 111 of the boost DC-DC converter 102 is connected to a power supply terminal 109 of the boost DC-DC converter 102 and a P-type electrode of the Schottky diode 401. An N-type electrode of the Schottky diode 401 is connected to a charging terminal 112 of the electric power storage device 103 (e.g., refer to JP 2004-120950 A).

With such the configuration, in the conventional electronic equipment, even when the voltage of the electric power generated by the power generation device is lower than the charging voltage of the electric power storage device due to downsizing of the power generation device, it is possible to charge this electric power into the electric power storage device. In addition, since the output terminal and the power supply terminal of the boost DC-DC converter are connected thereto, the boost DC-DC converter can operate by using a part of the boosted electric power which the boost DC-DC converter itself has converted and generated. As a result, the boost DC-DC converter can be driven with voltage higher than that used for operating the boost DC-DC converter using the electric power generated by the power generation device, thereby making it possible to enhance an electric power converting ability of the boost DC-DC converter. Further, if the boost DC-DC converter is activated, even in a case where the voltage of the electric power generated by the power generation device thereafter becomes lower than the voltage with which the boost DC-DC converter can operate, the boost DC-DC converter can charge the generated electric power into the electric power storage device while maintaining the operation thereof as long as the boosted electric power is sufficiently larger than the electric power used for operating the boost DC-DC converter.

Further, by providing the Schottky diode to the electronic equipment, it is possible to prevent the stored electric power of the electric power storage device from flowing reversely to the boost DC-DC converter in a case where power generation of the power generation device has been stopped.

In other words, in the conventional electronic equipment with the above-mentioned configuration, even when the voltage of the electric power generated by the power generation device is lower than the charging voltage of the electric power storage device due to downsizing of the power generation device, it is possible to charge the electric power into the electric power storage device. In addition, as long as the boost DC-DC converter is once activated, even when the voltage of the electric power generated by the power generation device is lower than the operating voltage of the boost DC-DC converter, it is possible to charge the electric power into the electric power storage device when the electric power is sufficiently supplied. Further, the conventional electronic equipment may have a feature that the stored electric power of the electric power storage device is consumed only by the load.

However, in the conventional electronic equipment with the above-mentioned configuration, a forward drop voltage is generated in the Schottky diode, which causes a charging loss when the boosted electric power of the boost DC-DC converter is charged into the electric power storage device. The charging loss increases as the charging voltage of the electric power storage device becomes lower. For example, when the charging voltage of the electric power storage device is 3.0 V, a forward drop voltage of the Schottky diode is normally about 0.2 V, so about 7% of the charging loss is caused.

Further, for the conventional electronic equipment with the above-mentioned configuration, also proposed is a method in which a switching device is provided in place of the above-mentioned Schottky diode, or a switching device is provided in an electric power supplying path from the output terminal of the boost DC-DC converter to the power supply terminal of the boost DC-DC converter, and in which the switching device is turned off when the electric power storage device is not charged, thereby preventing the stored electric power of the electric power storage device from being consumed by a drive of the boost DC-DC converter. In the method, however, a configuration of a circuit for detecting a case where the electric power storage device is not charged may become complicated, power consumption in the circuit may be increased, or the switching device may not be reliably controlled, thereby lowering charging efficiency in some cases.

In other words, in the conventional electronic equipment with the above-mentioned configuration, there arise problems in that the charging efficiency is lowered when the electric power generated by the power generation device is charged into the electric power storage device, or a manufacturing cost is increased because a complicated circuit is additionally provided for improving the charging efficiency.

SUMMARY OF THE INVENTION

Therefore, according to a first aspect of the present invention, there is provided an electronic equipment including: a power generation device for generating electric power; a boost DC-DC converter for converting the electric power into a first boosted electric power; and an electric power storage device for charging the first boosted electric power, in which: the boost DC-DC converter generates the first boosted electric power by converting the electric power into a pulse-like boosted electric power and rectifying the pulse-like boosted electric power by a first rectifying means. The electronic equipment further includes a second rectifying means for rectifying the pulse-like boosted electric power. In the electronic equipment, the boost DC-DC converter is operated using a second boosted electric power generated by rectifying the pulse-like boosted electric power by the second rectifying means.

With the above-mentioned configuration, the present invention may have a feature of preventing a decrease in charging efficiency and increase in manufacturing cost which have been proposed as conventional problems.

According to a second aspect of the present invention, there is provided an electronic equipment including a reverse-current preventing circuit having a switching device in a charging path through which the first boosted electric power is charged into the electric power storage device, in which the reverse-current preventing circuit detects a state where the stored electric power of the electric power storage device reversely flows to the boost DC-DC converter by monitoring the voltage of the second boosted electric power, to turn off the switching device.

With the above-mentioned configuration, the present invention may have not only the feature according to the first aspect, but also a feature of effectively utilizing the stored electric power of the electric power storage device.

In the electronic equipment according to the present invention with the above-mentioned configuration, the stored electric power of the electric power storage device is not consumed by the drive of the boost DC-DC converter, which improves the charging efficiency.

In addition, the electronic equipment according to the present invention does not require a complicated circuit for controlling the switching device for preventing the reverse-current, thereby making it possible to lower the manufacturing cost.

DETAILED DESCRIPTION OF THE PREFERRED EMBODIMENTS

First Embodiment

Figure 1:
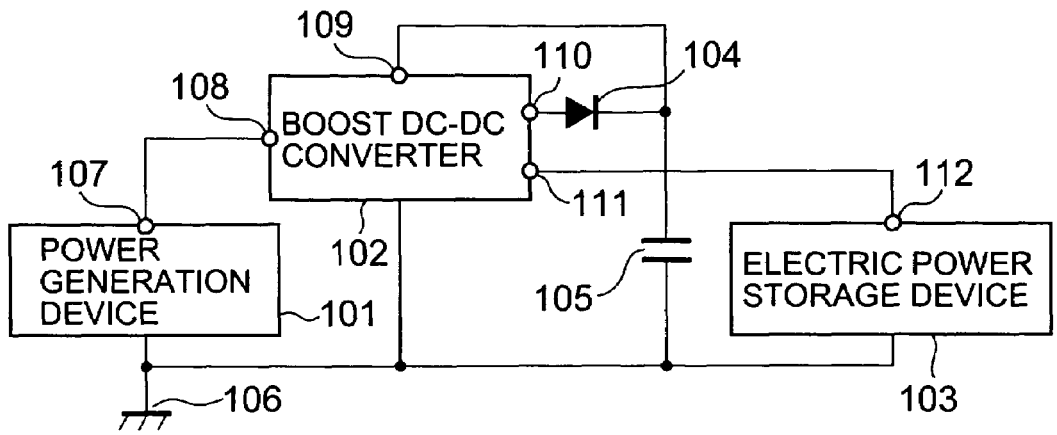
FIG. 1 is a schematic circuit block diagram of an electronic equipment according to a first embodiment of the present invention.

FIG. 1 is a schematic circuit block diagram of an electronic equipment according to a first embodiment of the present invention.

As shown in FIG. 1, the electronic equipment includes a power generation device 101 such as a fuel cell, a solar cell, or a thermal power generation device, a boost DC-DC converter 102, a Schottky diode 104, a power supply smoothing capacitor, and an electric power storage device 103. The boost DC-DC converter 102 converts, inside thereof, electric power outputted by the power generation device 101 into a pulse-like boosted electric power, and outputs the pulse-like boosted electric power and a first boosted electric power obtained by rectifying the pulse-like boosted electric power by a first rectifying means. The Schottky diode 104 serving as a second rectifying means rectifies the pulse-like boosted electric power. The power supply smoothing capacitor smoothes the second boosted electric power outputted by the Schottky diode 104. The electric power storage device 103 charges the first boosted electric power outputted by the boost DC-DC converter 102. The boost DC-DC converter 102 converts the electric power inputted from an input terminal 108 into the pulse-like boosted electric power, outputs the pulse-like boosted electric power from a pulse-like boosted electric power output terminal 110, and then outputs the electric power, which is obtained by rectifying the pulse-like boosted electric power by the first rectifying means provided inside thereof, from an output terminal 111 as the first boosted electric power. A power supply terminal 109 of the boost DC-DC converter 102 is configured to input a second boosted electric power outputted by the Schottky diode 104.

With such the configuration, the electric power outputted from the power generation device is converted into the pulse-like boosted electric power in the boost DC-DC converter 102. The first boosted electric power, which is obtained by rectifying the pulse-like boosted electric power by the first rectifying means, can be directly charged into the electric power storage device without the intermediation of the rectifying means such as the Schottky diode. The stored electric power of the electric power storage device does not reversely flow anywhere due to the first rectifying means. Further, the boost DC-DC converter can maintain an operation by using the second boosted electric power obtained by rectifying the pulse-like boosted electric power by the Schottky diode 104 serving as the second rectifying means. In addition, the second boosted electric power is voltage substantially equal to that of the first boosted electric power, so it is possible to obtain a performance equivalent to that of the boost DC-DC converter in the conventional electronic equipment in a case where the first boosted electric power is utilized for the operation of the boost DC-DC converter.

Figure 2:
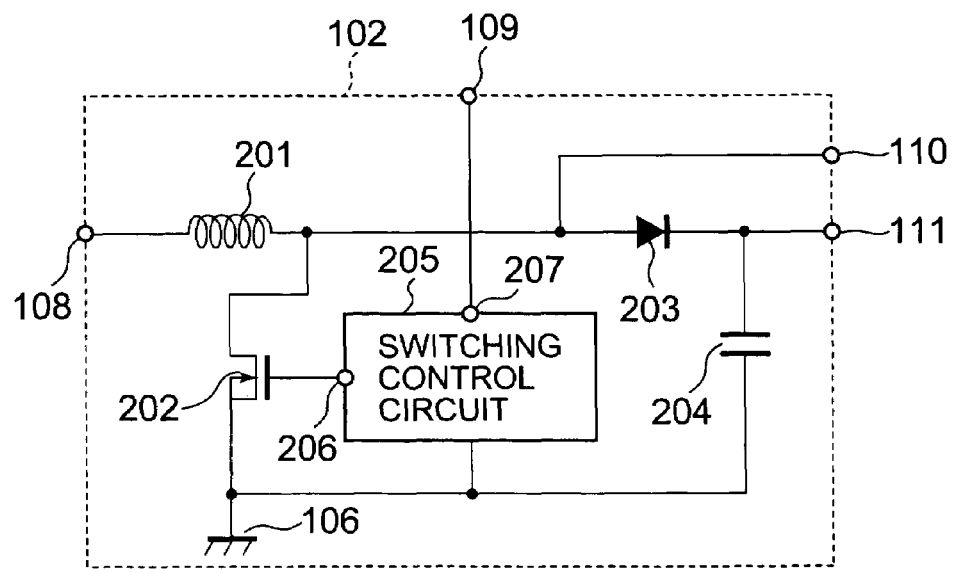
FIG. 2 is a schematic circuit block diagram showing an example of a configuration of the electronic equipment according to the first embodiment of the present invention, in which boosting is performed by using a coil in a boost DC-DC converter.

FIG. 2 is a schematic circuit block diagram showing an example of a configuration of the electronic equipment according to the first embodiment of the present invention, in which boosting is performed by using a coil in the boost DC-DC converter.

As shown in FIG. 2, the electronic equipment includes a coil 201, an N-channel type MOSFET 202, a switching control circuit 205, a Schottky diode 203 serving as the first rectifying means, and an output voltage smoothing capacitor 204. An input terminal 108 is connected to a first electrode of the coil 201, and a second electrode of the coil 201 is connected to a drain of the N-channel type MOSFET 202, a P-type electrode of the Schottky diode 203, and a pulse-like boosted electric power output terminal 110, respectively. A power supply terminal 207 of the switching control circuit 205 is connected to a power supply terminal 109 of a boost DC-DC converter 102. A control terminal 206 of the switching control circuit 205 is connected to a gate of the N-channel type MOSFET 202. A source of the N-channel type MOSFET 202 is connected to a ground terminal 106. An N-type electrode of the Schottky diode 203 is connected to an output terminal 111 and a first electrode of the output voltage smoothing capacitor 204. Further, a second electrode of the output voltage smoothing capacitor 204 is connected to the ground terminal 106.

With such the configuration, it is possible to drive the switching control circuit by using the boosted electric power of the boost DC-DC converter which is inputted from the power supply terminal of the boost DC-DC converter in a similar manner as in the boost DC-DC converter with a conventional configuration in which boosting is performed by using a coil. Further, by controlling switching-on-duty of the N-channel type MOSFET in the switching control circuit, it is possible to obtain a desired boosted electric power, and in addition, it is possible to output, from the pulse-like boosted electric power output terminal, the pulse-like boosted electric power generated inside the boost DC-DC converter.

Figure 3:
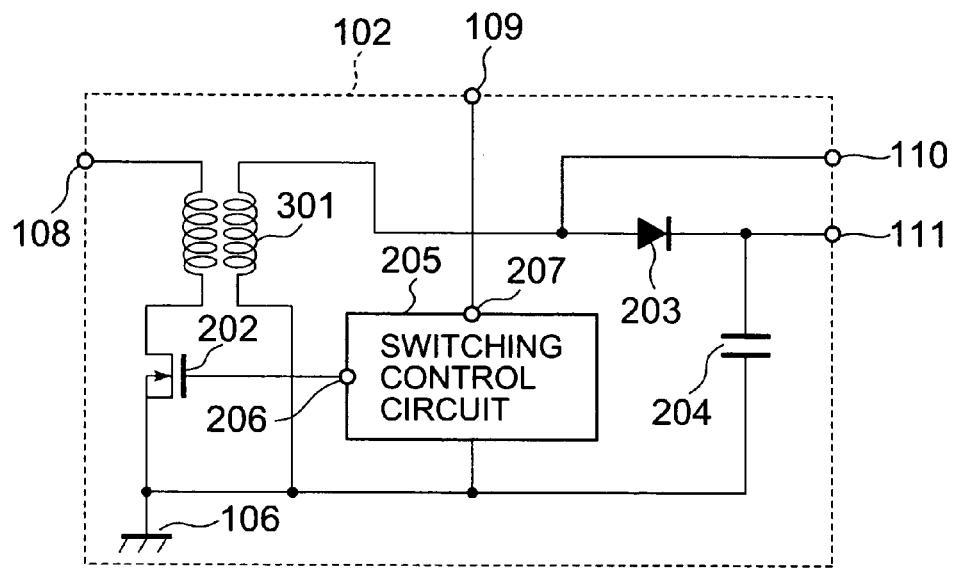
FIG. 3 is a schematic circuit block diagram showing an example of a configuration of the electronic equipment according to the first embodiment of the present invention, in which boosting is performed by using transformers in the boost DC-DC converter.

FIG. 3 is a schematic circuit block diagram showing an example of a configuration of the electronic equipment according to the first embodiment of the present invention, in which boosting is performed by using transformers in the boost DC-DC converter.

As shown in FIG. 3, the electronic equipment has substantially the same configuration as that of the example of the configuration shown in FIG. 2 in which boosting is performed by using the coil, except for the following points. That is, transformers 301 are provided in placed of the coil 201 of FIG. 2, a first electrode and a second electrode of a primary side coil of the transformers 301 are connected to an input terminal 108 and a drain of the N-channel type MOSFET 202, respectively, a first electrode of a secondary side coil of the transformers 301 is connected to a P-type electrode of the Schottky diode 203 and a pulse-like boosted electric power output terminal 110, and a second electrode of the secondary side coil of the transformers 301 is connected to a ground terminal 106.

Note that the operation with the configuration in which boosting is performed by using the above-mentioned transformers is the same as that in the configuration in which boosting is performed by using the coil, so description thereof will be omitted.

As described above, while, in the conventional electronic equipment, it is necessary to provide the Schottky diode for preventing a reverse-current of the stored electric power between the output terminal of the boost DC-DC converter and the electric power storage device, the electronic equipment according to the present invention does not require the Schottky diode. Accordingly, in the electronic equipment according to the present invention, the charging efficiency for the electric power storage device becomes higher than the conventional electronic equipment because the charging loss due to the forward drop voltage of the Schottky diode is not caused. As a result, the electric power of the power generation device can be charged into the electric power storage device with efficiency.

Further, in the conventional electronic equipment, the switching device is provided in place of the Schottky diode provided between the output terminal of the boost DC-DC converter and the electric power storage device, or the switching device is provided in the power supplying path from the output terminal of the boost DC-DC converter to the power supply terminal of the boost DC-DC converter, to turn off the switching device in a case where the electric power storage device is not charged, thereby preventing the stored electric power of the electric power storage device from being consumed by the drive of the boost DC-DC converter. Meanwhile, in the electronic equipment according to the present invention, it is possible to obtain the performance equivalent to that obtained by the configuration of the conventional electronic equipment by providing only the Schottky diode serving as the second rectifying means and the power supply smoothing capacitor of the boost DC-DC converter without complicating the circuit having a function of controlling those switching devices, because the electronic equipment according to the present invention detects the case where the electric power is not charged into the electric power storage device. As a result, the manufacturing cost can be lowered as compared with the conventional electronic equipment. Further, in the conventional electronic equipment with the above-mentioned configuration, there has been generated a consumption current of the circuit for controlling the switching devices or an electric power loss under the operating condition in which the switching devices are not reliably controlled. However, in the electronic equipment according to the present invention, it is not necessary to provide the complicated control circuit and the switching control, so the electric power of the power generation device can be charged into the electric power storage device with efficiency, and the stored electric power of the electric power storage device is not wastefully consumed, as compared with the conventional electronic equipment with the above-mentioned configuration.

Note that in the above-mentioned electronic equipment according to the present invention, the Schottky diode is used as the rectifying means. Alternatively, a switching device such as the MOSFET may be used in place of the Schottky diode to function as the rectifying means for turning off the switch when the current reversely flows. In a case where the charging voltage of the electric power storage device is high, a common diode may be used in place of the Schottky diode.

In addition, in the above-mentioned electronic equipment according to the present invention, the configuration in which boosting is performed by using a coil or transformers is employed for the boost DC-DC converter. Alternatively, a booster circuit of a charge pump system or a switched capacitor system in which boosting is performed by using a capacitor, or a booster circuit using a piezo-electric device, each of which generates the pulse-like boosted electric power inside thereof, may be used in place of the boost DC-DC converter as long as the operation of those booster circuits can be maintained by the second boosted electric power obtained by rectifying the pulse-like boosted electric power by the second rectifying means.

Second Embodiment

Figure 4:
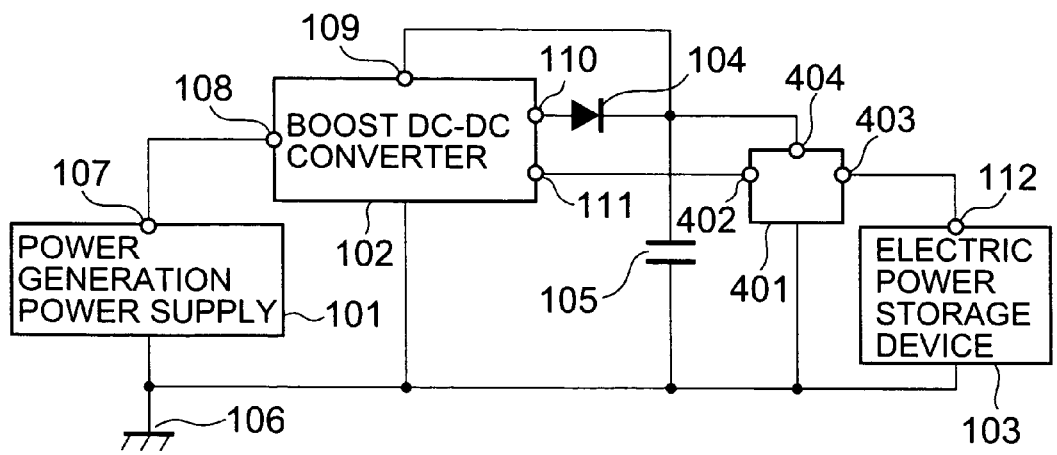
FIG. 4 is a schematic circuit block diagram of an electronic equipment according to a second embodiment of the present invention.

FIG. 4 is a schematic circuit block diagram of an electronic equipment according to a second embodiment of the present invention.

As shown in FIG. 4, the electronic equipment has a configuration similar to that of the electronic equipment according to the first embodiment of the present invention shown in FIG. 1 except for the following points. In the electronic equipment according to the second embodiment of the present invention, a reverse-current preventing circuit 401 for preventing stored electric power of the electric power storage device 103 from reversely flowing to the boost DC-DC converter 102 is provided, the output terminal 111 of the boost DC-DC converter 102 is connected to an input terminal 402 of the reverse-current preventing circuit 401, the charging terminal 112 of the electric power storage device 103 is connected to an output terminal 403 of the reverse-current preventing circuit 401, and a monitor terminal 404 of the reverse-current preventing circuit 401 is connected to an N-type electrode of the Schottky diode 104 serving as the second rectifying means.

With the above-mentioned configuration, the reverse-current preventing circuit monitors, through the monitor terminal, the second boosted electric power obtained by rectifying, by the boost DC-DC converter, the pulse-like boosted electric power outputted from the pulse-like boosted electric power output terminal by the Schottky diode serving as the second rectifying means, thereby indirectly monitoring a state where the stored electric power of the electric power storage device reversely flows. In a case where the stored electric power of the electric power storage device is detected to be in a state of reversely flowing in the reverse-current preventing circuit, the switching device provided in the reverse-current preventing circuit is turned off, thereby making it possible to prevent the stored electric power of the electric power storage device from flowing reversely.

It should be noted that a reason for providing the reverse-current preventing circuit with the above-mentioned configuration is that the Schottky diode serving as the first rectifying means shown in FIGS. 2 and 3 improves an electric power conversion efficiency of the boost DC-DC converter, thereby increasing an amount of the reverse-current with the Schottky diode having low forward drop voltage. In other words, the reason is that, in a case where the boost DC-DC converter does not generate the boosted electric power, the stored electric power of the electric power storage device is prevented from being consumed from flowing reversely due to the reverse-current of the Schottky diode serving as the first rectifying means.

In addition, a reason for employing the configuration in which it is determined whether the stored electric power of the electric power storage device is in a state of flowing reversely, by monitoring the second boosted electric power, is described as follows. A conventional electronic equipment has adopted a method of detecting the state where the stored electric power of the electric power storage device reversely flows by providing the reverse-current preventing circuit at the same position as that of the present invention to monitor voltage of a power generation device or a voltage drop of a resistance device provided in a charging path of the reverse-current. However, in a case where the voltage of the power generation device is monitored, there arise problems in that an extremely complicated monitoring circuit must be provided because the voltage to be monitored is extremely low, and a monitoring accuracy deteriorates to a large extent because the voltage depends on an amount of converted electric power of the boost DC-DC converter. Further, when the voltage drop of the resistance device is monitored, there arise problems in that a charging loss is caused due to the voltage drop, and the configuration of the circuit for monitoring the drop voltage is made complicated. In this embodiment, the second boosted electric power having high voltage is monitored, so it is possible to monitor the second boosted electric power with a circuit having a simple configuration, and there is no need to provide in the charging path a resistance device for monitoring the current, which produces an effect in which the charging loss generated due to the voltage drop of the resistance device is not caused.

Figure 5:
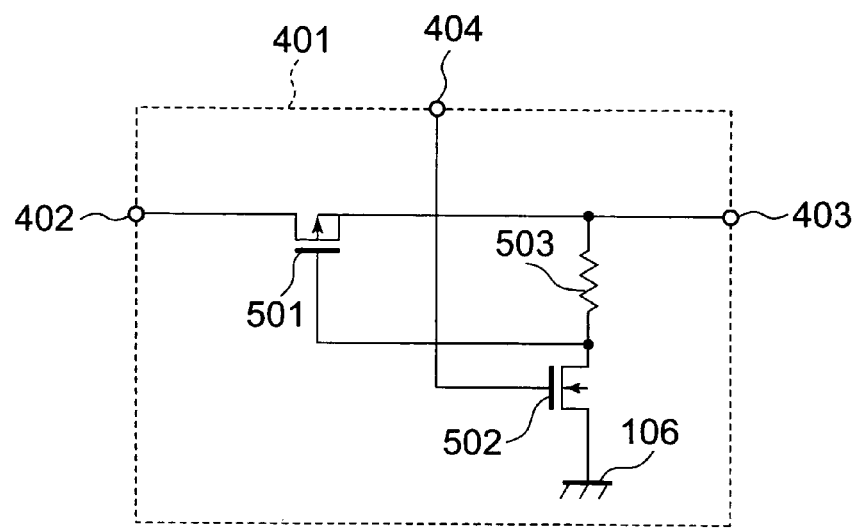
FIG. 5 is a circuit diagram showing an example of a circuit for achieving a function of a reverse-current preventing circuit in the electronic equipment according to the second embodiment of the present invention.
Figure 6:
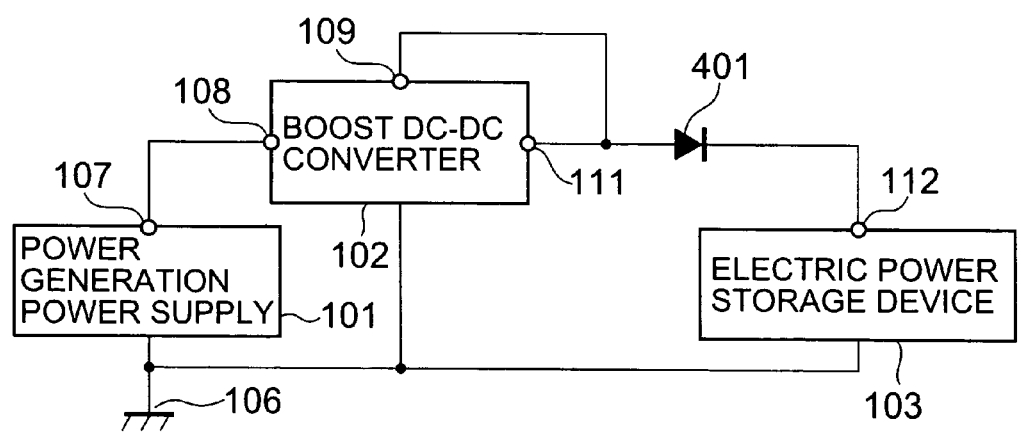
FIG. 6 is a schematic circuit block diagram of a conventional electronic equipment.

FIG. 5 is a circuit diagram showing an example of a circuit for achieving a function of a reverse-current preventing circuit in the electronic equipment according to the second embodiment of the present invention.

As shown in FIG. 5, the circuit according to the second embodiment includes a P-channel type MOSFET 501, an N-channel type MOSFET 502, and a resistance device 503. The input terminal 402 of the reverse-current preventing circuit 401 is connected to a drain of the P-channel type MOSFET 501, and a source of the P-channel type MOSFET 501 is connected to a first electrode of the resistance device 503 and the output terminal 403 of the reverse-current preventing circuit 401. A second electrode of the resistance device 503 is connected to a gate of the P-channel type MOSFET 501 and a drain of the N-channel type MOSFET 502, a gate of the N-channel type MOSFET 502 is connected to the monitor terminal 404 of the reverse-current preventing circuit 401, and a source of the N-channel type MOSFET 502 is connected to the ground terminal 106.

With the above-mentioned configuration, when voltage of the second boosted electric power inputted from the monitor terminal of the reverse-current preventing circuit 401 exceeds a threshold voltage of the N-channel type MOSFET 502, the N-channel type MOSFET 502 is turned on. As a result, gate voltage of the P-channel type MOSFET 501 becomes a low level, and the P-channel type MOSFET 501 is turned on. In other words, when the voltage of the second boosted electric power exceeds the threshold voltage of the N-channel type MOSFET 502, the first boosted electric power from the boost DC-DC converter inputted to an input terminal of the reverse-current preventing circuit is charged into the electric power storage device through the output terminal of the reverse-current preventing circuit. In addition, when the voltage of the second boosted electric power inputted from the monitor terminal of the reverse-current preventing circuit 401 becomes lower than the threshold voltage of the N-channel type MOSFET 502, the N-channel type MOSFET 502 is turned off. Thus, the gate voltage of the P-channel type MOSFET 501 becomes a high level and the P-channel type MOSFET 501 is turned off. That is, when the voltage of the second boosted electric power becomes lower than the threshold voltage of the N-channel type MOSFET 502, the stored electric power of the electric power storage device reversely flows to the input terminal from the output terminal of the reverse-current preventing circuit, thereby making it possible to prevent the current from reversely flowing to the boosted DC-DC converter.

It should be noted that in the reverse-current preventing circuit with the above-mentioned configuration, when the voltage of the second boosted electric power is lower than the threshold voltage of the N-channel type MOSFET 502 built therein, as described above, the threshold voltage of the N-channel type MOSFET 502 built therein is adjusted to prevent the stored electric power of the electric power storage device from reversely flowing. As a result, it is possible to know the state where the stored electric power of the electric power storage device reversely flows more precisely.

In addition, the circuit configuration of the reverse-current preventing circuit shown in FIG. 5 adopts a method of configuring the circuit with minimum elements. Alternatively, the above-mentioned function for preventing the stored electric power of the electric power storage device from flowing reversely is also achieved by employing the following configurations. That is, the function is achieved with: a configuration in which, when the voltage of the second boosted electric power becomes lower than the predetermined voltage, a voltage detection circuit for outputting a low-level voltage is additionally provided to input an output signal of the voltage detection circuit to the gate of the N-channel type MOSFET; or a configuration in which a voltage comparison circuit for comparing the second boosted electric power with the voltage of the electric power storage device is provided to output the low-level signal when a voltage difference between the second boosted electric power and the voltage of the stored electric power is lower than the predetermined voltage to thereby input the output signal of the voltage comparison circuit to the gate of the N-channel type MOSFET.

What is claimed is:

1. An electronic equipment having a boost DC-DC converter, comprising:
a boost DC-DC converter configured to convert an electric power received from a power generation device into a boosted electric power, to output the boosted electric power, and to output a first boosted electric power signal, the boost DC-DC converter comprising;
a first rectifying means for rectifying the boosted electric power to obtain the first boosted electric power;
a second rectifying means for rectifying the boosted electric power into a second boosted electric power;
an electric power storage device configured to receive and be charged by the first boosted electric power; and
a reverse-current preventing circuit in a charging path through which the first boosted electric power is supplied to the electric power storage device, the reverse-current preventing circuit comprising:
a voltage detection circuit for monitoring a voltage of the second boosted electric power; and
a switching device controlled by the voltage detection circuit;
wherein the boost DC-DC converter uses the second boosted electric power as a power supply.

2. The electronic equipment having a boost DC-DC converter according to claim 1, wherein, when detecting a state where stored electric power of the electric power storage device flows reversely to the boost DC-DC converter, the voltage detection circuit turns off the switching device.

3. An electronic equipment having a boost DC-DC converter, comprising:
a boost DC-DC converter configured to receive an electric power from a power generation device and to convert the electric power into a boosted electric power, the boost DC-DC converter comprising;
a first rectifying means for rectifying the boosted electric power to obtain a first boosted electric power;
a first output terminal at which the boost DC-DC converter outputs the first boosted electric power;
a second output terminal at which the boost DC-DC converter outputs the boosted electric power; and
a power supply input terminal at which the DC-DC converter receives a power supply;
a second rectifying means for rectifying the boosted electric power into a second boosted electric power and provide the second boosted electric power to the power supply input terminal of the boost DC-DC converter, wherein the second rectifying means is connected between the second output terminal and the power supply input terminal; and
an electric power storage device configured to receive and be charged by the first boosted electric power.

4. The electronic equipment having a boost DC-DC converter according to claim 3, further comprising a reverse-current preventing circuit having a switching device, in a charging path through which the first boosted electric power is charged into the electric power storage device.

5. The electronic equipment having a boost DC-DC converter according to claim 4, wherein the reverse-current preventing circuit comprises:
a voltage detection circuit for monitoring voltage of the second boosted electric power; and
the switching device controlled by the voltage detection circuit.

6. The electronic equipment having a boost DC-DC converter according to claim 5, wherein, when detecting a state where stored electric power of the electric power storage device flows reversely to the boost DC-DC converter, the voltage detection circuit turns off the switching device.

* * * * *

UNITED STATES PATENT AND TRADEMARK OFFICE
CERTIFICATE OF CORRECTION

PATENT NO. : 7,652,454 B2  Page 1 of 1
APPLICATION NO. : 11/542486
DATED : January 26, 2010
INVENTOR(S) : Fumiyasu Utsunomiya It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 587 days.

Signed and Sealed this

Twenty-third Day of November, 2010

David J. Kappos
*Director of the United States Patent and Trademark Office*